UNITED STATES PATENT OFFICE.

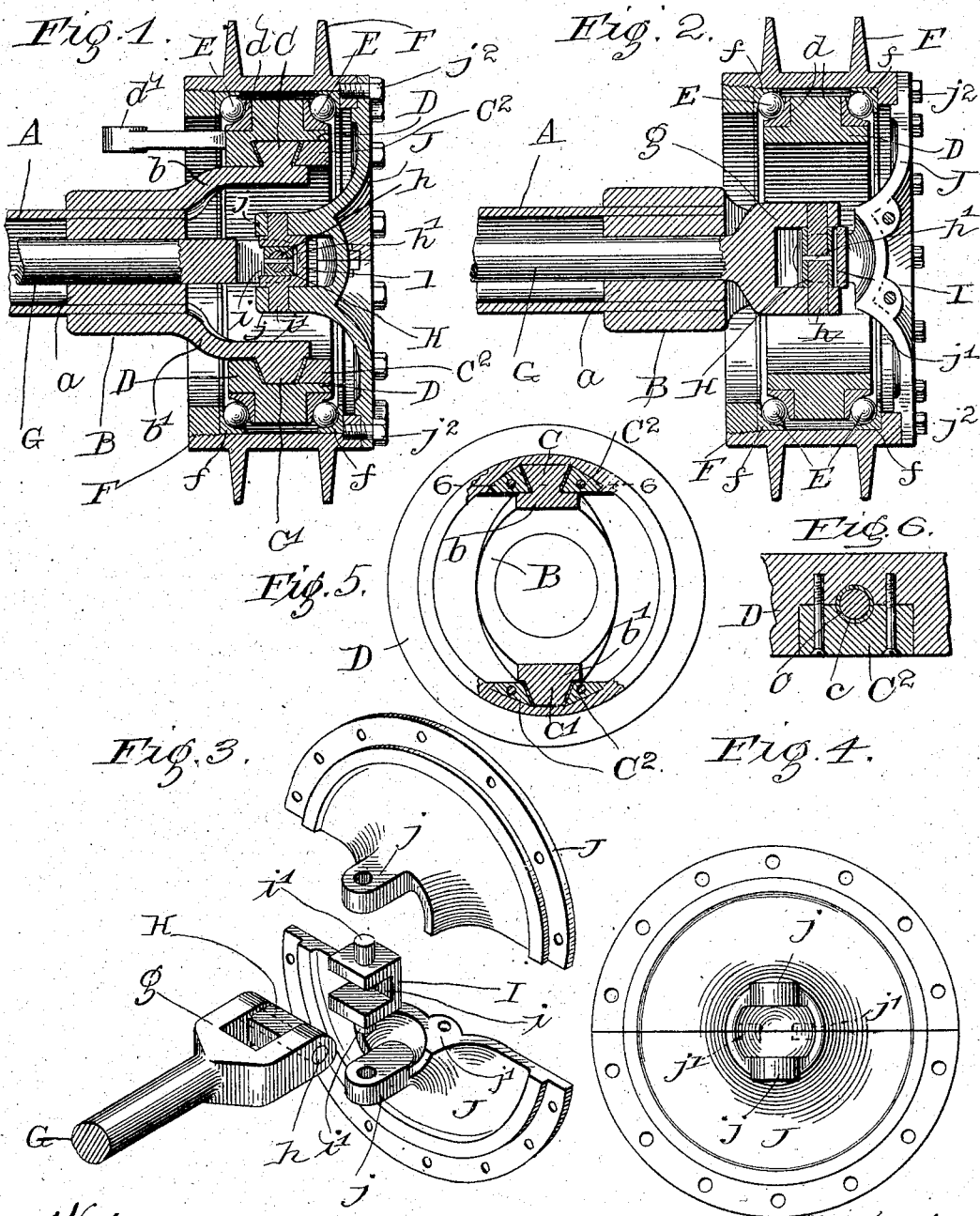

HANS THEODORE HANSEN, OF MILWAUKEE, WISCONSIN.

DRIVING-GEAR FOR MOTOR-VEHICLES.

No. 796,121. Specification of Letters Patent. Patented Aug. 1, 1905.

Application filed November 7, 1904. Serial No. 231,623.

*To all whom it may concern:*

Be it known that I, HANS THEODORE HANSEN, a citizen of the United States of America, residing at Milwaukee, in the county of Milwaukee and State of Wisconsin, have invented certain new and useful Improvements in Driving-Gear for Motor-Vehicles and the Like, of which the following is a specification.

My invention relates to certain improvements in driving-gear for motor-vehicles and the like; and its purpose is to produce a separable universal joint particularly adapted for use within the hub of a wheel for the purpose of affording a flexible connection between a steering-wheel and a driving-shaft journaled in the axle and at the same time permitting the removal of the wheel from its bearings without reference to the universal joint. While this is the particular problem that has called forth this invention, it will become obvious in the course of the description that it is applicable to a large number of analogous uses varying somewhat in their specific requirements.

In the drawings, Figure 1 is a vertical longitudinal section through a hub and one end of an axle connected therewith. Fig. 2 is a horizontal section at right angles to the plane of Fig. 1. Fig. 3 is a view of certain detached parts adjacent to the universal joint. Fig. 4 is an inner face view of the two-part front plate of the hub. Fig. 5 is a face view of the bearing-ring and axle-fork, partly broken out to illustrate the pivotal connection thereof; and Fig. 6 is a section in the line 6 6 of Fig. 5.

Referring to the drawings, A is a tubular axle, upon the end of which is a collar B, the outer end of which is forked to provide two diverging arms $b\ b'$. The outer ends of these arms are provided with oppositely-extending pins C C', and a bearing-ring D is pivoted upon these pins in a substantially vertical line. The pivot-pins are of inverted frusto-conical form, as illustrated in Fig. 1, and are surrounded by split bushings $c$ and held in place by blocks $C^2$, screwed or otherwise secured to the ring, as shown in Fig 6. In this way the weight upon the axle is distributed to the upper and lower portion of the bearing-ring. This bearing-ring is provided with cones $d$, upon which run balls E, the opposite sides of which run upon cups $f$ in the hub F. An arm $d'$, rigid with the bearing-ring, provides means for oscillating said ring upon its vertical axis.

Within the axle A is a bearing $a$, in which is journaled a driving-shaft G. The outer end of this driving-shaft is forked at $g$, (see Fig. 3,) and a rectangular block H is pivoted between the ends of the forks by means of a pin $h$, held against longitudinal movement in the block by means of a smaller pin $h'$. (See Fig. 2.) A yoke I is formed with a rectangular notch $i$ in its central portion fitting over the block H and with oppositely-extending gudgeons $i'$, projecting at right angles to the pin $h$. A two-part hub-cap J is provided with inwardly-extending perforated arms $j$, which fit over the gudgeons $i'$, and also with ears $j'$, which bolt together to make the plate a substantially rigid structure and at the same time permit it to be divided for the purpose of inserting or removing the yoke I. The two-part hub cap or plate J is secured to the outer side of the hub by means of screws $j^2$, and when thus secured the plate, together with the yoke I, are removed from the bearing with the wheel and may be replaced in engagement with the driving-axle without inconvenience.

It should be noticed that the pins or studs of this universal joint work in cylindrical bearings, so as to be supported on all sides, and that in taking the bearing apart the two portions which are separated from each other are portions which in the ordinary working of the joint have no necessary relative movement.

The forks $g$ of the driving-shaft are preferably slightly wider at their ends than the intermediate block H, so that the yoke I, which fits over the block, also fits between the two arms. Because of this fact when the joint is assembled the block H and the yoke I work as if formed of one piece.

I recognize that the particularly specific construction described may be varied in many particulars without departing from my invention, and therefore do not limit myself to the exact form, construction, or arrangement of the parts set forth, except as definitely pointed out in the claims.

I claim as new and desire to secure by Letters Patent—

1. The combination with an axle and a wheel mounted upon the end thereof and constructed and arranged to oscillate thereon, of a driving-shaft, and a universal-joint connection sesured to the end of the driving-shaft in line with the axis of oscillation of the wheel, said universal-joint connection containing a portion made up of two parts which are readily separable in the direction in which the wheel is removed from its bearings, but which have no necessary relative movement in the operation of the joint when the wheel is mounted upon said bearings, one of said parts being pivoted to the driving-shaft and the other to the wheel, substantially as described.

2. The combination with a driving-shaft and a part driven thereby, of a universal-joint connection between the shaft and said part, comprising an intermediate member pivoted, in axes at right angles to each other, to the driving-shaft, and to said part, said member being composed of two separable portions provided with means for maintaining them in the same relative positions during the ordinary working of the universal joint, one of said parts being pivoted to the driving-shaft and the other to the wheel, substantially as described.

3. The combination with a driving-shaft having a forked end, of a non-circular block, pivoted between the forks of said end, a yoke fitting over said block and between said forks, and provided with gudgeons at right angles to the pivotal axis between the forks and the block, and a two-part driven member the respective portions of which have arms fitting respectively over said gudgeons and being provided with means for securing them rigidly together, substantially as described.

4. The combination with an axle and a driving-shaft, of a wheel journaled to rotate about the center and to oscillate with respect to said axle, a fork upon the end of the driving-shaft having perforations in its arms, a front plate for the hub, inwardly-extending arms thereon, and an intermediate two-part separable member, the respective parts of which are pivoted to the shaft-arms, and the plate-arms respectively, in lines at right angles to each other, substantially as described.

5. The combination of a driving-shaft, an axle, a wheel mounted to oscillate upon the axle, and also to rotate thereon, a fork upon the end of the shaft, a non-circular block pivoted between the arms of said fork, a yoke fitted to said non-circular block and confined against lateral movement by the fork, gudgeons upon said yoke at right angles to the block-pivot, and a two-part front plate for the hub, the respective portions of which have arms fitting over said gudgeons, substantially as described.

6. The combination with an axle and a driving-shaft journaled therein, of a fork upon the end of the axle, a bearing-ring pivoted upon said fork, a wheel journaled upon said bearing-ring, a fork upon the end of the driving-shaft, a non-circular block between the arms of said fork, a pin extending through said block and said arms and secured against longitudinal movement in the block, a yoke fitting over said block and between the arms of the fork, gudgeons upon said yoke extending oppositely therefrom at right angles to the pivotal axis between the fork and the block, a two-part front plate for the wheel, having inwardly-extending arms pivoted upon said gudgeons and means for securing the two parts of said plate together, substantially as described.

7. The combination with a driving-shaft and a wheel-hub driven thereby, of a universal-joint connection between the shaft and hub, a bearing-ring upon which the hub is journaled, an axle, and inverted frusto-conical pivot-pins supported by the axle pivoted in the bearing-ring.

In witness whereof I have signed the above application for Letters Patent, at Milwaukee, in the county of Milwaukee and State of Wisconsin, this 2d day of November, A. D. 1904.

HANS THEODORE HANSEN.

Witnesses:
CHAS. B. PERRY,
FRANK H. MORSE.